United States Patent
Moore et al.

(10) Patent No.: US 10,416,005 B2
(45) Date of Patent: Sep. 17, 2019

(54) OPTICAL INTERROGATOR FOR PERFORMING INTERFEROMETRY USING FIBER BRAGG GRATINGS

(71) Applicant: Hifi Engineering Inc., Calgary (CA)

(72) Inventors: Brian H. Moore, Edmonton (CA); Walter Jeffrey Shakespeare, Macungie, PA (US); Phillip William Wallace, Bernardsville, NJ (US); Viet Hoang, Edmonton (CA); Tom Clement, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 122 days.

(21) Appl. No.: 15/532,963

(22) PCT Filed: Dec. 4, 2015

(86) PCT No.: PCT/CA2015/051269
§ 371 (c)(1),
(2) Date: Jun. 2, 2017

(87) PCT Pub. No.: WO2016/086310
PCT Pub. Date: Jun. 9, 2016

(65) Prior Publication Data
US 2018/0266854 A1    Sep. 20, 2018

Related U.S. Application Data

(60) Provisional application No. 62/207,251, filed on Aug. 19, 2015, provisional application No. 62/087,669, filed on Dec. 4, 2014.

(51) Int. Cl.
*G01B 9/02* (2006.01)
*G01B 11/16* (2006.01)
(Continued)

(52) U.S. Cl.
CPC ..... *G01D 5/35316* (2013.01); *G01B 9/02067* (2013.01); *G01B 11/161* (2013.01);
(Continued)

(58) Field of Classification Search
CPC ................................................ G01B 11/16–20
See application file for complete search history.

(56) References Cited

U.S. PATENT DOCUMENTS 5,481,391 A    1/1996 Giles
5,848,204 A   12/1998 Wanser
(Continued)

FOREIGN PATENT DOCUMENTS

CA    2379900 A1    10/2002
CA    2639131 A1     2/2005
(Continued)

OTHER PUBLICATIONS

International Search Report and Written Opinion of the International Searching Authority, dated Mar. 1, 2016, for corresponding International Application No. PCT/CA2015/051269, 16 pages.
(Continued)

*Primary Examiner* — Shawn Decenzo
(74) *Attorney, Agent, or Firm* — Klarquist Sparkman, LLP

(57) ABSTRACT

An optical fiber interrogator for interrogating optical fiber that includes fiber Bragg gratings ("FBGs"). The interrogator includes a light source operable to emit phase coherent light, amplitude modulation circuitry optically coupled to the light source and operable to generate pulses from the light, and control circuitry communicatively coupled to the amplitude modulation circuitry that is configured to perform a method for interrogating the optical fiber. The method includes generating a pair of light pulses by using the
(Continued)

amplitude modulation circuitry to modulate light output by the light source without splitting the light.

20 Claims, 11 Drawing Sheets

(51) Int. Cl.
    *G01D 18/00*     (2006.01)
    *G01D 5/353*     (2006.01)

(52) U.S. Cl.
    CPC ............ *G01B 11/18* (2013.01); *G01D 18/00* (2013.01); *G01B 2290/70* (2013.01)

(56) References Cited

U.S. PATENT DOCUMENTS

| | | | |
|---|---|---|---|
| 5,903,350 A | 5/1999 | Bush et al. | |
| 6,137,565 A | 10/2000 | Ecke et al. | |
| 6,256,090 B1* | 7/2001 | Chen | G01B 11/18 250/227.14 |
| 6,417,507 B1 | 7/2002 | Malvern et al. | |
| 6,466,706 B1 | 10/2002 | Go et al. | |
| 6,556,509 B1 | 4/2003 | Cekorich et al. | |
| 6,674,928 B2 | 1/2004 | Johnson et al. | |
| 6,778,720 B1 | 8/2004 | Cekorich et al. | |
| 6,785,004 B2* | 8/2004 | Kersey | E21B 47/102 356/35.5 |
| 6,847,453 B2 | 1/2005 | Bush | |
| 7,145,704 B1 | 12/2006 | Islam | |
| 7,283,216 B1* | 10/2007 | Geng | G01B 11/18 356/35.5 |
| 7,315,666 B2* | 1/2008 | Van Der Spek | E21B 47/01 385/12 |
| 7,324,714 B1* | 1/2008 | Cranch | G01B 11/18 250/227.16 |
| 7,433,045 B2 | 10/2008 | Ronnekleiv et al. | |
| 7,697,121 B1 | 4/2010 | Coroy et al. | |
| 7,940,400 B2 | 5/2011 | Lopushansky et al. | |
| 8,339,591 B2 | 12/2012 | Volanthen et al. | |
| 8,401,401 B2 | 3/2013 | Hartog et al. | |
| 8,737,439 B2 | 5/2014 | Wilk et al. | |
| 8,994,953 B2 | 3/2015 | Crickmore | |
| 9,476,760 B2 | 10/2016 | Brady et al. | |
| 9,500,767 B2 | 11/2016 | Barfoot et al. | |
| 2004/0028311 A1* | 2/2004 | Moslehi | G01B 11/16 385/12 |
| 2005/0046859 A1* | 3/2005 | Waagaard | G01B 11/18 356/478 |
| 2005/0047706 A1* | 3/2005 | Waagaard | G01D 5/345 385/11 |
| 2005/0174966 A1* | 8/2005 | Lansford | H04L 5/023 370/329 |
| 2006/0181711 A1* | 8/2006 | Waagaard | G01D 5/3539 356/478 |
| 2006/0285850 A1* | 12/2006 | Colpitts | G01B 11/16 398/108 |
| 2013/0188168 A1* | 7/2013 | Hartog | E21B 47/102 356/32 |
| 2015/0100279 A1 | 4/2015 | Ronnekleiv et al. | |
| 2016/0109222 A1* | 4/2016 | Wang | G01L 1/246 356/34 |
| 2016/0266005 A1 | 9/2016 | Bos | |
| 2017/0075064 A1* | 3/2017 | Docter | G02B 6/12023 |
| 2017/0153154 A1* | 6/2017 | Hull | G01D 5/35316 |
| 2018/0171778 A1* | 6/2018 | Hoehn | G01D 5/35374 |
| 2018/0356210 A1 | 12/2018 | Moore et al. | |

FOREIGN PATENT DOCUMENTS

| | | |
|---|---|---|
| CA | 2484320 A1 | 4/2005 |
| CA | 2485030 A1 | 4/2005 |
| CA | 2535964 A1 | 8/2006 |
| CA | 2587191 A1 | 11/2007 |
| CA | 2790209 A1 | 8/2011 |
| WO | WO2016/000064 A1 | 1/2016 |
| WO | WO2016/012760 A2 | 1/2016 |

OTHER PUBLICATIONS

Optiphase—A Haliburton Service, "TDI-7000 TDM Fiber Interrogator," http://web.archive.org/web/20160821074822/http://optiphase.com/data_sheets/TDI-7000_Data_Sheet_Rev_E, Aug. 6, 2013, 2 pages.

International Search Report and Written Opinion of the International Searching Authority, dated Aug. 16, 2018, for corresponding International Application No. PCT/CA2018/050682, 22 pages.

Dutton, "Understanding Optical Communications," IBM, International Technical Support Organization, http://www.redbooks.ibm.com, SG24-5230-00, 638 pgs, Sep. 1998.

Office Action from the United States Patent & Trademark Office in co-pending U.S. Appl. No. 15/868,766, dated Nov. 30, 2018.

Office Action from the United States Patent & Trademark Office in co-pending U.S. Appl. No. 15/868,766, dated Jul. 25, 2019.

\* cited by examiner

OPTICAL INTERROGATOR FOR PERFORMING INTERFEROMETRY USING FIBER BRAGG GRATINGS

CROSS REFERENCE TO RELATED APPLICATIONS

This is the U.S. National Stage of International Application No. PCT/CA2015/051269, filed Dec. 4, 2015, which in turn claims the benefit of U.S. Provisional Application No. 62/207,251, filed Aug. 19, 2015 and U.S. Provisional Application No. 62/087,669, filed Dec. 4, 2014.

TECHNICAL FIELD

The present disclosure is directed at an optical interrogator for performing interferometry using fiber Bragg gratings.

BACKGROUND

Optical interferometry is a technique in which two separate light pulses, a sensing pulse and a reference pulse, are generated and interfere with each other. When optical interferometry is used for fiber optic sensing applications, the sensing and reference pulses are at least partially reflected back towards an optical receiver. For example, optical interferometry may be performed by directing the sensing and reference pulses along an optical fiber that comprises fiber Bragg gratings, which partially reflect the pulses back towards an optical receiver at which interference is observed. The nature of the interference observed at the optical receiver provides information on the optical path length the pulses traveled, which in turn provides information on parameters such as the strain the optical fiber experienced.

The circuitry that generates, modulates, and receives the sensing and reference pulses is typically contained within a device called an optical interrogator. There exists a continued desire to advance and improve technology used in optical interrogators.

SUMMARY

According to a first aspect, there is provided an optical fiber interrogator for interrogating optical fiber comprising fiber Bragg gratings ("FBGs"). The interrogator comprises a light source operable to emit phase coherent light; amplitude modulation circuitry optically coupled to the light source and operable to generate pulses from the light, wherein the pulses are generated without splitting the light; and control circuitry comprising a controller, communicatively coupled to the amplitude modulation circuitry, configured to perform a method for interrogating the optical fiber comprising generating a pair of light pulses by using the amplitude modulation circuitry to modulate light output by the light source.

The interrogator may further comprise a phase modulator optically coupled to the amplitude modulation circuitry and operable to introduce a phase shift to at least one of the pulses, and the method may further comprise phase shifting at least one of the light pulses relative to the other of the light pulses by using the phase modulator.

The phase modulator may be selected from the group consisting of a lithium niobate phase modulator, a gallium arsenide phase modulator, and an indium phosphide phase modulator.

The interrogator may further comprise an output optical amplifier optically coupled to the phase modulator; receiver circuitry; and an optical circulator comprising first, second, and third ports, wherein the first port is optically coupled to the output optical amplifier, a second port is optically coupled to an output of the interrogator for respectively sending and receiving the pulses to and from the optical fiber, and a third port is optically coupled to the receiver circuitry for processing signals received from the optical fiber.

The interrogator may further comprise polarization maintaining fiber between the light source and the output such that the polarization of the light is maintained from the light source to the output.

The interrogator may further comprise polarization maintaining fiber between the output and the receiver circuitry such that the polarization of reflections off the FBGs are maintained from the output to the receiver circuitry.

The interrogator may further comprise a polarization controller optically coupled between the phase modulator and the output optical amplifier.

The interrogator may further comprise a polarization splitter optically coupled between the third port of the optical circulator and the receiver circuitry.

The interrogator may further comprise receiver circuitry; and an optical circulator comprising first, second, and third ports, wherein the first port is optically coupled to the phase modulator, a second port is optically coupled to an output of the interrogator for respectively sending and receiving the pulses to and from optical fiber, and a third port is optically coupled to the receiver circuitry for processing signals received from the optical fiber.

The light source may comprise a laser having a power of at least 100 mW.

The phase shifting may comprise applying a positive phase shift to a first pulse and applying a negative phase shift to a subsequent, second pulse intended to interfere with the first pulse.

The first and second pulses may differ in phase from each other by more than $\pi$ radians.

The method may further comprise generating a calibration pulse; determining when reflections of the calibration pulse off the FBGs arrive at the receiver circuitry; and based on differences in when the reflections of the calibration pulse arrive at the receiver circuitry, determining timing between the sensing and reference pulses.

The phase shifting may comprise applying a non-linear phase shift or a piecewise linear phase shift to at least one of the pulses.

The phase shift may be a Barker code.

The method may further comprise dithering leakage from the amplitude modulation circuitry by phase shifting the leakage between 0 and $\pi$ radians at a frequency at least 2.5 times higher than a frequency at which interrogation is being performed.

The amplitude modulation circuitry may comprise an input optical isolator and an output optical isolator isolating an input and output of the amplitude modulation circuitry, respectively; an optical attenuator optically coupled between the input and output isolators; and a first optical amplifier optically coupled between the attenuator and the output isolator.

The light source may comprise an electroabsorption modulated laser and the amplitude modulation circuitry may comprise an absorption region of the electroabsorption modulated laser.

According to another aspect, there is provided a system for interrogating optical fiber comprising fiber Bragg gratings ("FBGs") comprising any foregoing aspect of the interrogator optically coupled to the optical fiber, which is polarization maintaining fiber.

According to another aspect, there is provided a method for interrogating optical fiber comprising fiber Bragg gratings ("FBGs"). The method comprises generating a pair of light pulses from phase coherent light emitted from a light source, wherein the light pulses are generated by modulating the intensity of the light without splitting the light; transmitting the light pulses along the optical fiber; receiving reflections of the pulses off the FBGs; and determining whether an optical path length between the FBGs has changed from an interference pattern resulting from the reflections of the pulses.

Determining whether the optical path length has changed may comprise converting the interference pattern from an optical to an electrical signal.

The method may further comprise phase shifting at least one of the light pulses relative to the other of the light pulses.

A phase modulator may be used to phase shift at least one of the light pulses, and the phase modulator may be selected from the group consisting of a lithium niobate phase modulator, a gallium arsenide phase modulator, and an indium phosphide phase modulator.

Polarization of the light pulses may be maintained from when the light pulses are generated until the light pulses are transmitted along the optical fiber.

Polarization of the light pulses may be maintained from when the light pulses are generated until the interference pattern resulting from the reflections of the pulses is observed.

The method may further comprise splitting the polarization of the reflected pulses prior to converting the interference patterns.

The light source may be a laser and the intensity of the light may be modulated using a first optical amplifier external of and optically coupled to the laser.

The light may be generated by an electroabsorption modulated laser and the intensity of the light may be modulated using an absorption region comprising part of the laser.

The light source may comprise a laser having a power of at least 100 mW.

The phase shifting may comprise applying a positive phase shift to a first pulse and applying a negative phase shift to a subsequent, second pulse intended to interfere with the first pulse.

The first and second pulses may differ in phase from each other by more than $\pi$ radians.

The method may further comprise transmitting a calibration pulse to the FBGs; receiving reflections of the calibration pulse off the FBGs; and based on differences in when the reflections of the calibration pulse are received, determining timing between the sensing and reference pulses.

The phase shifting may comprise applying a non-linear phase shift or a piecewise linear phase shift to at least one of the pulses.

The phase shift may be a Barker code.

The method may further comprise dithering leakage from the light source by phase shifting the leakage between 0 and $\pi$ radians at a frequency at least 2.5 times higher than a frequency at which interrogation is being performed.

According to another aspect, there is provided a non-transitory computer readable medium having stored thereon program code to cause a processor to perform a method according to any of the above aspects or suitable combinations thereof for interrogating optical fiber comprising fiber Bragg gratings ("FBGs").

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. Optical interferometry has a variety of applications, one of which is being used to detect dynamic strain.

Figure 1A:
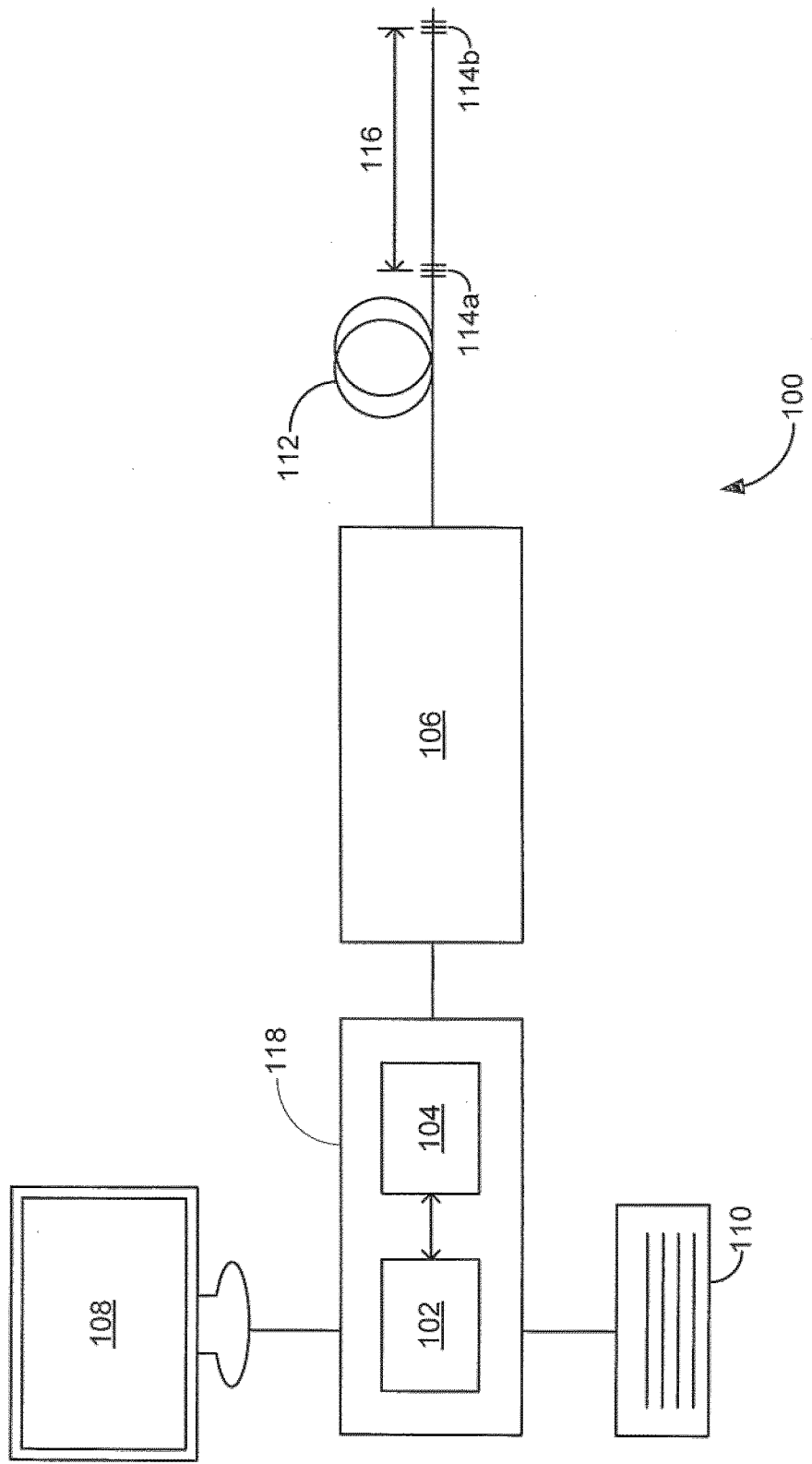
FIG. 1A is a block diagram of a system for detecting dynamic strain, which includes an optical fiber with fiber Bragg gratings ("FBGs") for reflecting a light pulse, according to one embodiment.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has stored on it program code to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
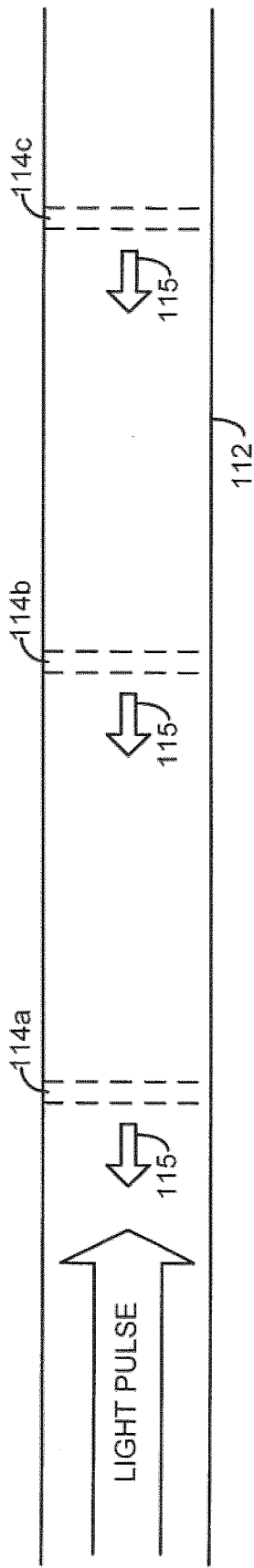
FIG. 1B is a schematic that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\theta = \frac{2\pi nL}{\lambda}$$

where n is the index of refraction of the optical fiber; L is the physical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
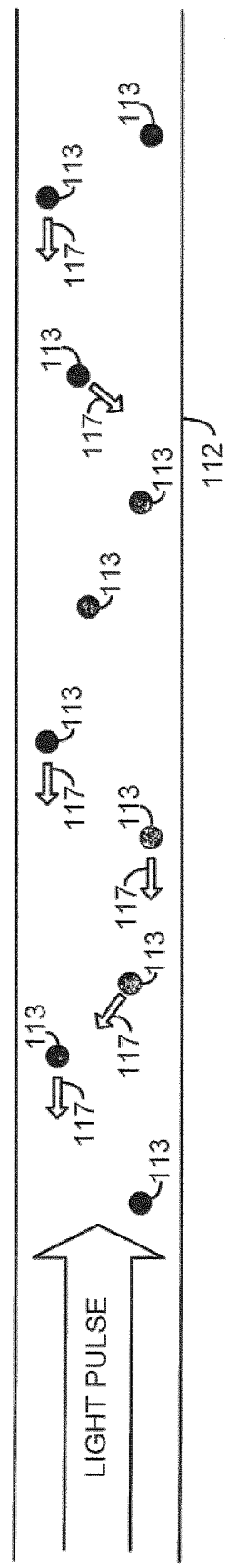
FIG. 1C is a schematic that depicts how a light pulse interacts with impurities in an optical fiber that results in scattered laser light due to Rayleigh scattering, which is used for distributed acoustic sensing ("DAS").

One conventional way of determining Δ nL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure dynamic strain offers several advantages over DAS, in terms of optical performance.

Figure 2:
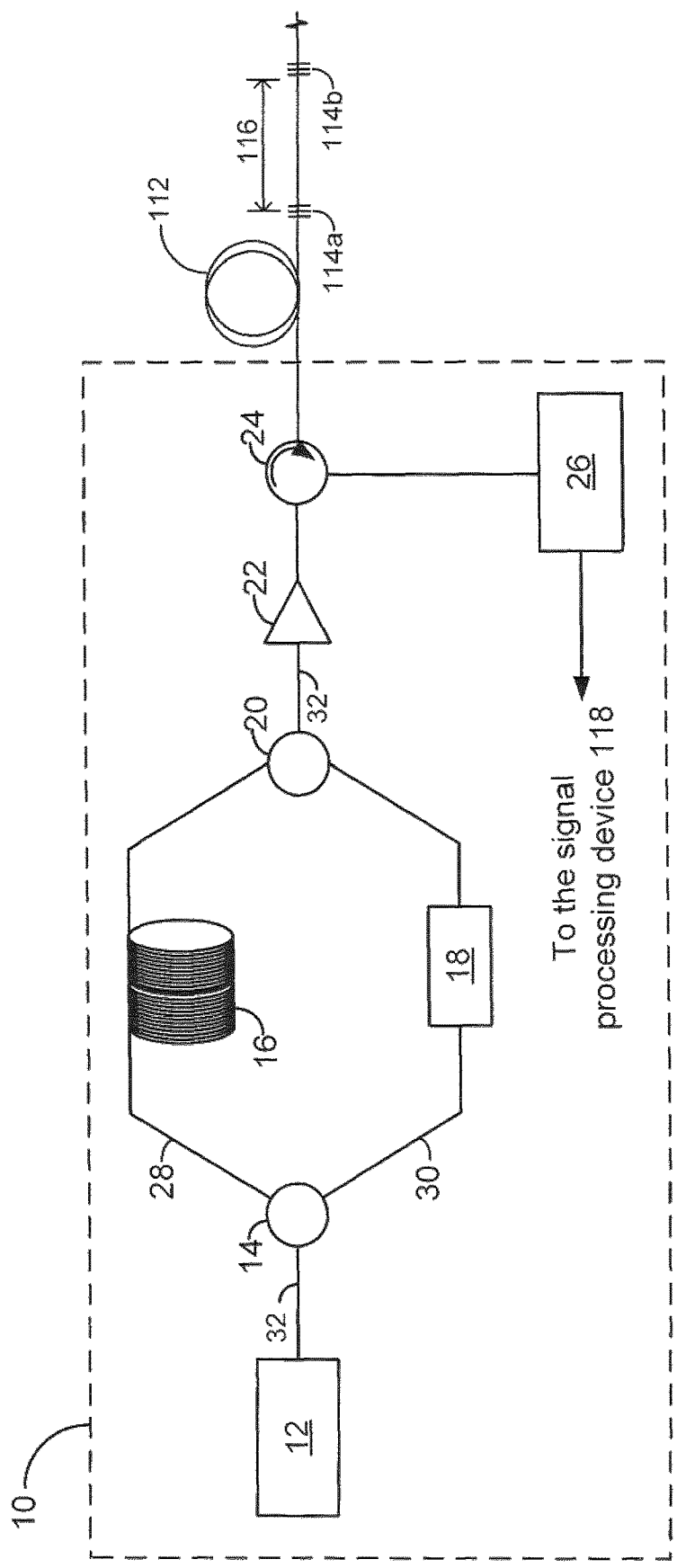
FIG. 2 is a schematic of an optical interrogator for performing interferometry using FBGs, according to the prior art.

FIG. 2 is a schematic of an example prior art interrogator 10 that may be used to perform FBG-based interferometry. The interrogator 10 comprises a narrowband light source 12 optically coupled via a single optical path 32 to a first optical coupler 14. The first optical coupler 14 splits any pulses emitted from the light source 12 into the sensing pulse, directed along a lower optical path 30, and the reference pulse, directed along an upper optical path 28. The upper optical path 28 comprises a loop of coiled fiber 16 that delays the reference pulse relative to the sensing pulse based on the spacing of the FBGs 114. The lower optical path 30 comprises a piezoelectric fiber stretcher 18, which is used to phase modulate the sensing pulse. The upper and lower optical paths 28,30 are collectively referred to as the interrogator's 10 "compensator". At the end of the compensator is a second optical coupler 20 that directs both pulses back along the single optical path 32. Between the second optical coupler 20 and the output of the interrogator 10 are an optical amplifier 22 and an optical circulator 24. Before leaving the interrogator 10, the sensing and reference pulses are amplified by the optical amplifier 22 and pass through the optical circulator 24. They are then transmitted to and reflect off of the FBGs 114 as described above in respect of FIGS. 1A-1C and return to the interrogator 10. Upon encountering the optical circulator 24 the reflected pulses are directed to receiver circuitry 26 and to the signal processing device 118 where any interference pattern can be analyzed.

This prior art interrogator 10 suffers from a variety of problems, such as the following:

(a) signal-to-noise ratio ("SNR") is prejudiced by splitting the light pulse emitted by the light source 12 at the first optical coupler 14 in order to create the sensing and reference pulses; and (b) by virtue at least in part of modulating through mechanical movement, the piezoelectric fiber stretcher 18:

(i) is relatively slow and is in practice used only to sinusoidally and approximately linearly (by using a relatively small subset of a sinusoidal modulation profile) modulate the sensing pulse; and (ii) introduces significant noise (mechanical noise and electrical noise resulting from high voltage power supplies used to power the stretcher 18), vibration, signal jitter, and birefringence to signal measurement, further prejudicing SNR.

The embodiments described herein are directed at improving upon at least one of the problems experienced by the prior art interrogator 10. More particularly, the embodiments described herein are directed at an interrogator in which generating the sensing and reference pulses is done without splitting a light pulse, which helps achieve a relatively high SNR. The embodiments described herein also do not use the piezoelectric fiber stretcher 18 to modulate the phase of the sensing pulse; instead, some of the embodiments use a solid state phase modulator, such as a lithium niobate phase modulator, that permits the sensing pulse to be non-linearly modulated and that introduces less noise and allows a more accurate phase determination than the piezo-electric fiber stretcher 18.

Figure 3:
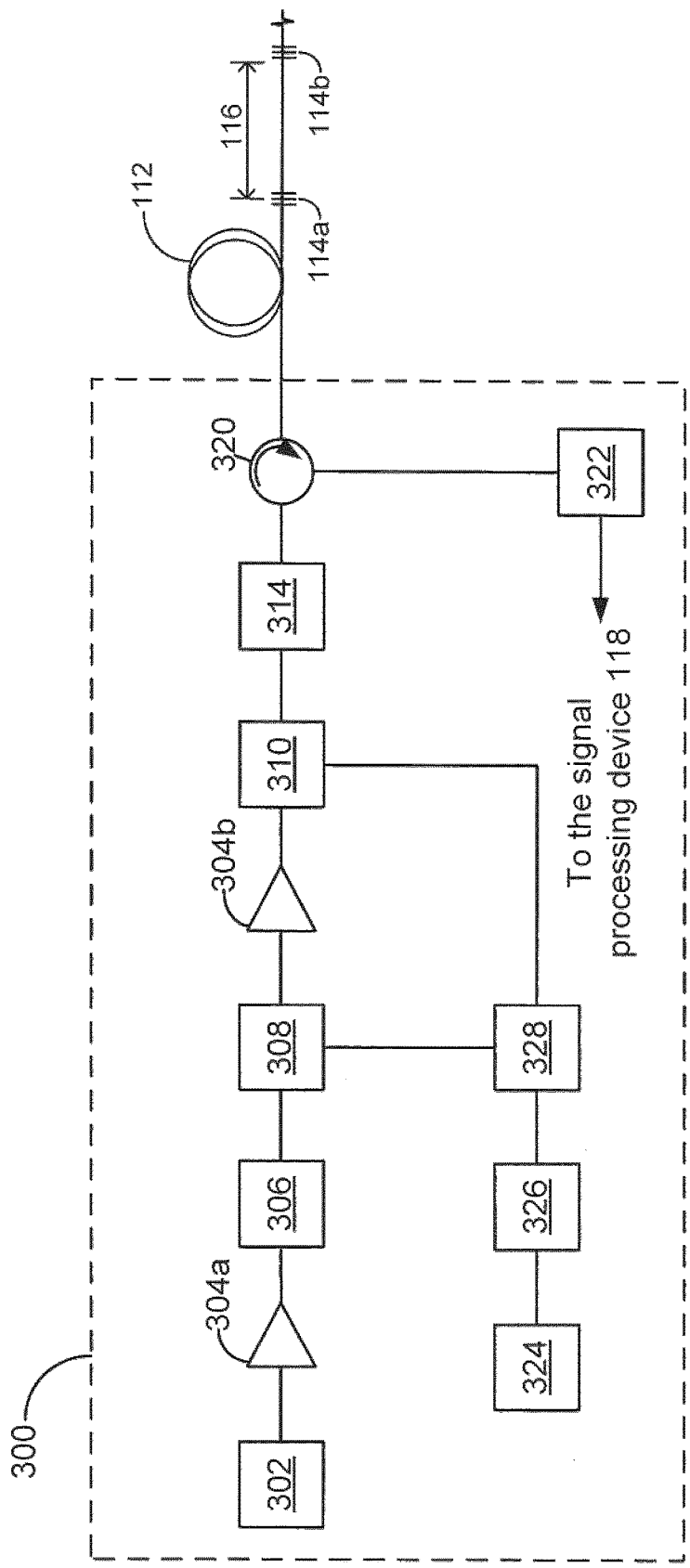
FIGS. 3 to 5 and 9A are schematics of an optical interrogator for performing interferometry using FBGs, according to various embodiments.

Referring now to FIG. 3, there is shown an optical interrogator 300 for performing interferometry using FBGs, according to one embodiment. The interrogator 300 comprises a light source in the form of a laser 302 whose output is optically coupled in series to various optical components; in order from the laser 302 these components are an input optical isolator 304a, an optical attenuator 306, a first optical amplifier 308, an output optical isolator 304b, a phase modulator 310, an output optical amplifier 314, and a first port of an optical circulator 320. A second port of the optical circulator 320 is optically coupled to the interrogator's 300 output. Optically coupled to the interrogator's 300 output is the optical fiber 112 comprising the FBGs 114. A third port of the optical circulator 320 is optically coupled to receiver circuitry 322, which in the depicted embodiment converts reflected light pulses into electrical signals but which in alternative embodiments may convert the reflected light pulses into a different type of signal, such as an acoustic signal. The optical circulator 320 directs light pulses entering its first port out its second port, and directs light pulses entering its second port out its third port. The effect of this is that the sensing and reference pulses are transmitted from the output optical amplifier 314 to the FBGs 114, while reflected pulses are transmitted from the FBGs 114 to the receiver circuitry 322. The optical fiber 112 is used to optically couple the components that comprise the laser 302, optical isolators 304a,b, optical attenuator 306, optical amplifiers 308,314, phase modulator 310, optical circulator 320, and receiver circuitry 322 together. However, in an alternative embodiment (not depicted) an alternative to the optical fiber 112 may be used to optically couple the various components together; for example, free space optical communication may be used to optically couple the various components together. In another alternative embodiment (not depicted), the optical circulator 320 may be replaced with a package comprising an optical coupler and an optical isolator.

In FIG. 3 the laser 302 outputs phase coherent light to permit the sensing and reflected pulses to interfere with each other after being reflected by the FBGs 114. More particularly, in one embodiment the laser 302 outputs phase coherent light during transmission of the sensing and reference pulses so that at least the sensing and reference pulses are phase coherent with each other; that is, the laser's 302 coherence time is at least as long as the time required to generate a pair of sensing and reference pulses. In an alternative embodiment, the laser 302 may have a longer coherence time; for example, the laser 302 may produce coherent light for at least the entire duration of interrogation (i.e., the time between generation of the first pulse and the last recorded interference pattern between pulses); for at least a certain multiple (e.g. ten times) of the duration that the sensing and reference pulses are generated for transmission along the optical fiber 112; or the laser 302 may always generate coherent light whenever in operation. Additionally, while the laser 302 is the light source in the depicted embodiment, alternative embodiments (not depicted) may comprise a non-laser coherent light source.

The interrogator 300 also comprises a controller 324 communicatively coupled to the first optical amplifier 308 and to the phase modulator 310 via a digital to analog converter 326 ("DAC 326") and an analog amplifier 328. The controller 324 is consequently able to control the amplitude and phase modulation of the sensing and reference pulses. The controller 324 is configured to perform a method for interrogating the FBGs 114 or for calibrating the interrogator 300, such as the example methods shown in FIGS. 7 and 8 and described in more detail, below. The controller 324 in the depicted embodiment is a field programmable gate array ("FPGA"), which is configured using a hardware description language such as VHDL or Verilog from which a netlist is generated and used to configure the FPGA in the field. The DAC 326 and analog amplifier 328 allow the controller 324 to output all digital signals and still be able to control the first optical amplifier 308 and phase modulator 310; in an alternative embodiment (not depicted) some or all of the signals the controller 324 outputs may be analog signals and the controller 324 may consequently be directly communicatively coupled to one or both of the amplifier 308 and phase modulator 310. Alternatively, one or both of the amplifier 308 and phase modulator 310 may be configured to receive digital input signals, in which case the controller 324 may be directly communicatively coupled to one or both of the amplifier 308 and phase modulator 310 if the controller 324 also outputs at least some digital signals. As another alternative (not depicted), one or both of the amplifier 308 and the phase modulator 310 may be configured to receive analog signals, the controller 324 may be configured to output at least some analog signals, and the controller 324 may be communicatively coupled to one or both of the amplifier 308 and phase modulator via an analog to digital converter and, optionally, a digital amplifier.

In this depicted embodiment, the laser 302 generates light centered on 1,550 nm and has a narrow line width and a long coherence length. The input optical isolator 304a prevents back reflections from destabilizing the laser 302. The optical attenuator 306 allows the intensity of the laser light to be varied so as not to saturate the first optical amplifier 308, which in this example embodiment is a semiconductor optical amplifier ("SOA"). The output optical isolator 304b prevents back reflections from destabilizing the first optical amplifier 308. The phase modulator 310, which in this example embodiment is a solid state lithium niobate phase modulator, allows the controller 324 to control phase modulation of one or both of the sensing and reference pulses. The output optical amplifier 314 boosts the power of the sensing and reference pulses for transmission to the FBGs 114; in this example embodiment, the output optical amplifier 314 is an erbium doped fiber amplifier ("EDFA").

Example component manufacturers are Covega™ Technologies for the first optical amplifier 308 and the phase modulator 310, Nuphoton™ Technologies, Inc. for the output optical amplifier 314, OSI™ Laser Diode Inc. for the receiver circuitry 322, OZ Optics™ Ltd. for the circulator 320, and Thorlabs™, Inc. for the optical isolators 304a,b.

Figure 7:
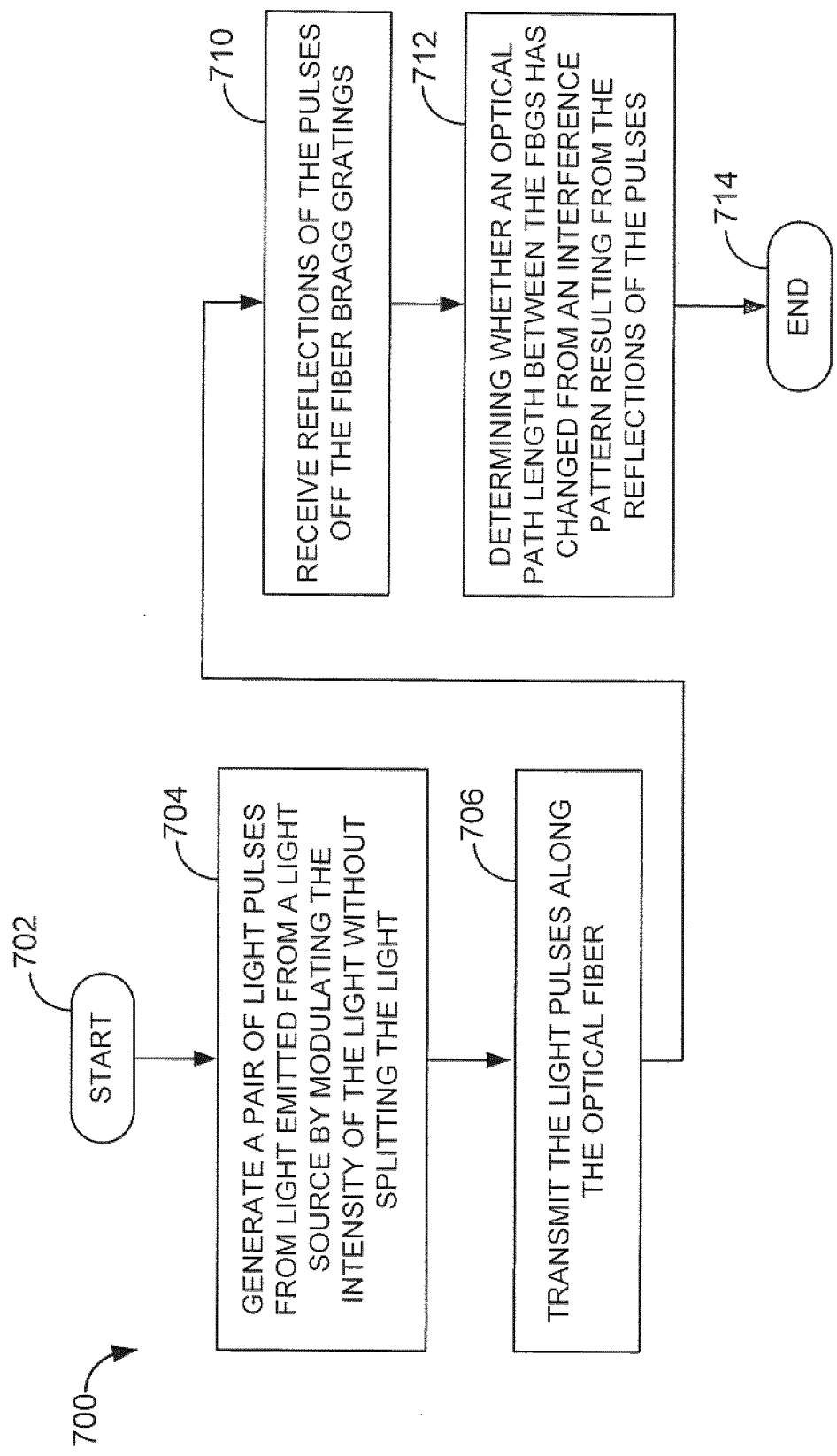
FIG. 7 is a method for interrogating optical fiber that comprises FBGs, according to another embodiment.

Referring now to FIG. 7, there is shown a method 700 for interrogating the optical fiber 112, according to another embodiment. As mentioned above, the method 700 is encoded on to the FPGA that comprises the controller 324 as a combination of FPGA elements such as logic blocks. The controller 324 begins performing the method 700 at block 702 and proceeds to block 704 where it generates a pair of light pulses using light emitted from a light source by modulating the intensity of the light without splitting the light; in the interrogator 300 of FIG. 3, these light pulses are the sensing and reference pulses and the light source is the laser 302. To generate the sensing and reference pulses the controller 324 controls the first optical amplifier 308 to modulate the amplitude of the light the laser 302 emits. Modulating the light without splitting the light as done in the prior art interrogator 10 facilitates the interrogator 300 in FIG. 3 having a higher SNR than the prior art interrogator 10 because generating the sensing and reference pulses does not comprise halving the input intensity of light by splitting a light pulse along the upper and lower paths 28,30. The amplitude modulation used to generate the pair of light pulses without splitting the light may comprise, for example, one or both of absorbing and reflecting the light.

After being generated, the pulses are amplified by the output optical amplifier 314 and are transmitted through the optical circulator 320 and to the optical fiber 112 and the FBGs 114 (block 706). The pulses are then reflected off the FBGs 114 and return to the interrogator 300 (block 708) where they are directed via the optical circulator 320 to the receiver circuitry 322, which in the depicted embodiment converts the interference pattern resulting from the reflections into an electrical signal. The interference patterns resulting from the reflections are then observed, such as at the signal processing software 118, and an operator of the interrogator 300 can determine whether the optical path length between the FBGs 114 has changed from the interference pattern that results from interference of the reflections (block 710). For example, the operator can make determinations about the nature of the dynamic strain experienced by the fiber segments 116 between the FBGs 114.

In some alternative embodiments, between blocks 704 and 706 the controller 324 phase shifts one of the light pulses relative to the other of the light pulses; that is, in the example embodiment in which the sensing and reference pulses are generated, the controller 324 causes the phase modulator 310 to phase shift one or both of the sensing and reference pulses. When the phase modulator 310 is a lithium niobate phase modulator, the modulator 310 is able to introduce a phase shift of up to +/− π to one or both of the sensing and reference pulses; by introducing a phase shift of as much as +π to one of the pulses and as much as −π to the other of the pulses, the controller 324 can introduce a phase difference of anywhere from 0 to 2π between the pulses. In contrast to the conventional piezoelectric fiber stretcher 18, using a lithium niobate phase modulator permits faster phase modulation rates (in the depicted embodiment, the phase modulator 308 can modulate at up to 10 GHz, and alternative and commercially available phase modulators 308 can modulate at up to 40 GHz), introduces less noise, and permits non-linear modulation schemes. A lithium niobate phase modulator permits non-linear and piecewise linear modulation schemes; for example, any of a sinusoidal, sawtooth, triangle, and stepwise function can be used to drive the phase modulator 310, with the light pulses being modulated accordingly. In another alternative embodiment, a Barker code may be used for phase modulation.

However, even without phase shifting one or both of the pulses the interrogator 300 is able to interrogate the optical fiber 112. By independently generating two light pulses without splitting a single pulse, the interrogator 300 is able to generate pulses of approximately twice the power than if two pulses were generated by splitting a single pulse as is done in the prior art interrogator 10. Additionally, generating two pulses using the amplitude modulation circuitry of the interrogator 300 allows finer timing control, regardless of phase modulation, than the prior art interrogator 10 and also permits the sensing and reference pulses to be generated with a variety of different amplitudes, including amplitudes that are different from each other. In the prior art interrogator 10, the sensing and reference pulses typically have identical amplitudes because they are generated by splitting a pulse from the light source 12 in half.

Figure 4:
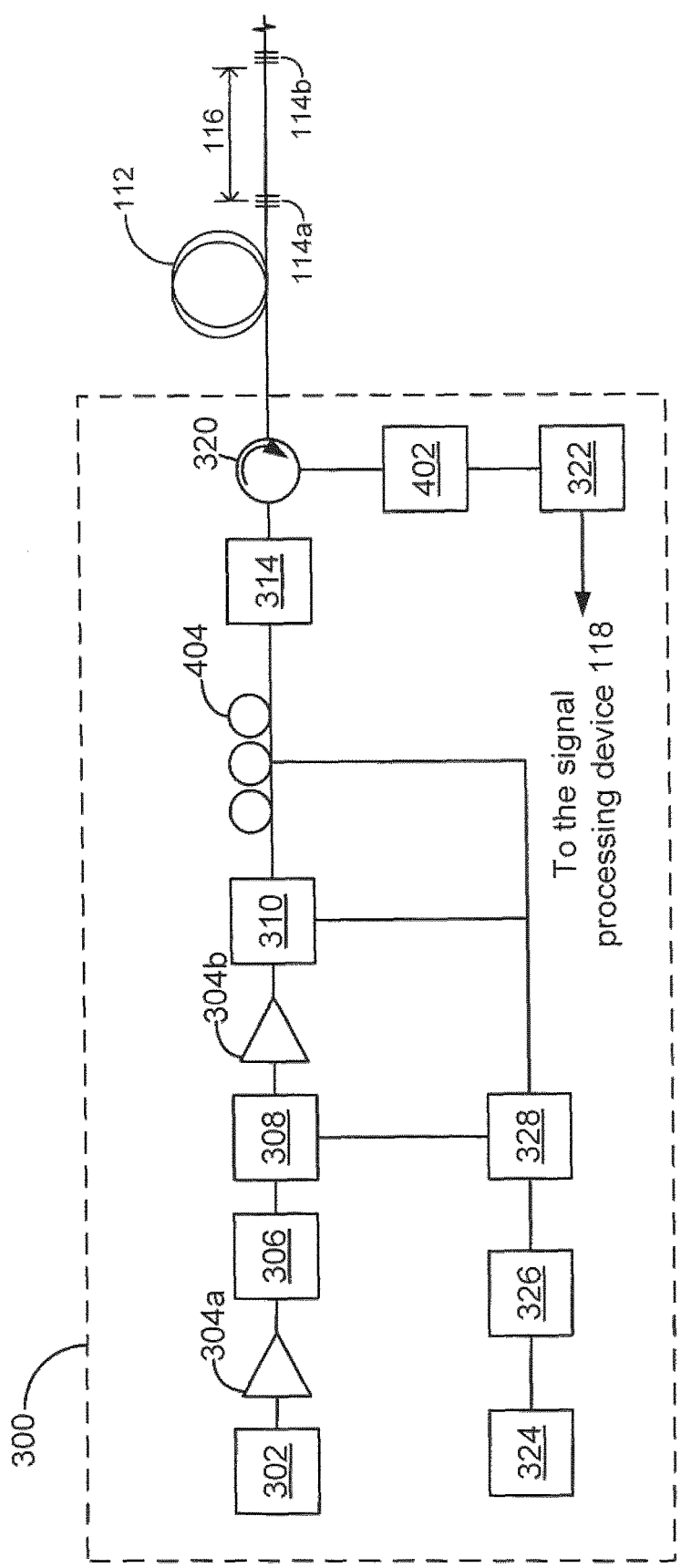
Figure 5:
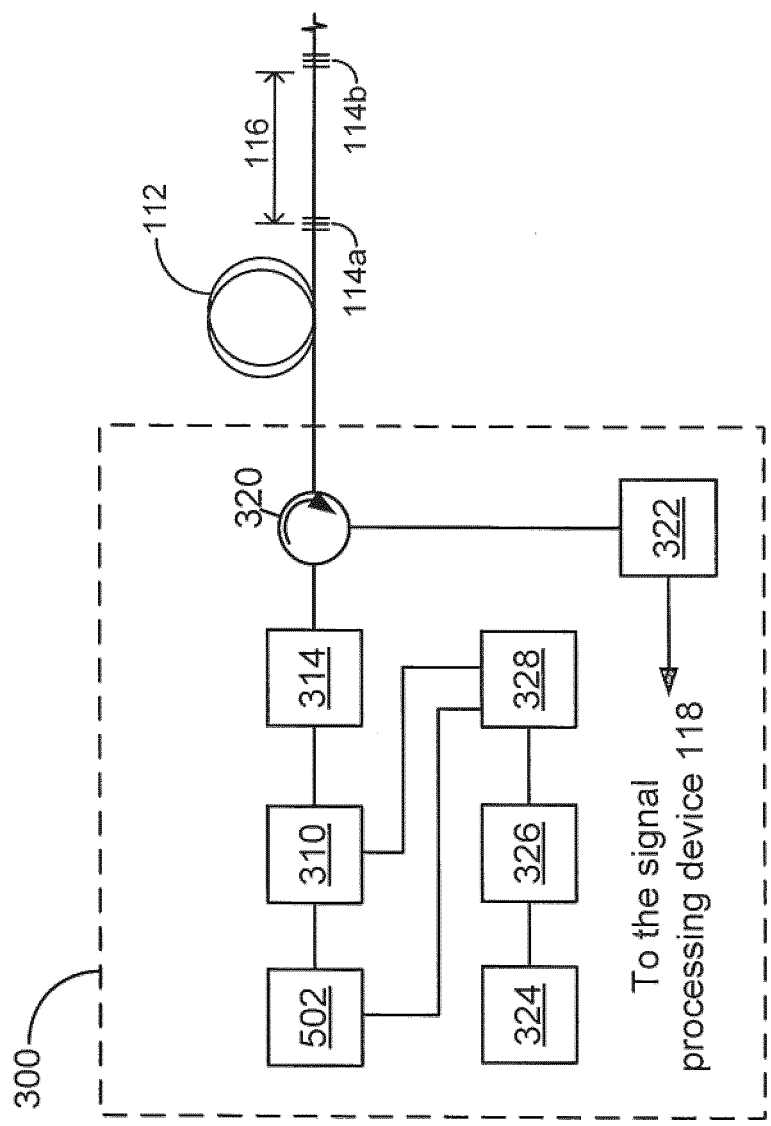

The embodiments of the interrogator 300 shown in FIGS. 3-5 may be used without activating the phase modulator 310 to phase shift the sensing or reference pulses relative to each other, as described above in respect of FIG. 7. In alternative embodiments (not depicted), the interrogator 300 may be constructed without the phase modulator 310 and accordingly be designed for amplitude modulation only. For example, alternative embodiments of the interrogator 300 may be based on or identical to the embodiments of FIGS. 3-5 except that they may be missing the phase modulator 310.

As alluded to above in respect of FIG. 1A, in some alternative embodiments (not depicted) the fiber 112 may comprise groups of two or more of the FBGs 114, with these groups located at different positions along the fiber 112 and with the FBGs 114 in any one of these groups tuned to a common center wavelength that is different from the center wavelength to which the FBGs 114 in the other groups are tuned. For example, there may be a first group of three FBGs 114 along the fiber 112 extending from 200 m to 250 m from the interrogator 300 and tuned to a first center wavelength, a second group of three FBGs 114 along the fiber 112 extending from 400 m to 450 m from the interrogator 300 and tuned to a second center wavelength different from the first center wavelength, and a third group of three FBGs 114 along the fiber 112 extending from 600 m to 650 m from the interrogator 300 and tuned to a third center wavelength different from the first and second center wavelengths. In this example, the controller 324 may be configured to cause the interrogator 300 to use TDM to interrogate each of these three different groups of FBGs 114 using pulses of the three different wavelengths of light launched from the interrogator 300 at different times. For example, a first pair of sensing and reference pulses at the first center wavelength may be launched for the first group of FBGs 114 at times $t_1$ and $t_2$, a second pair of sensing and reference pulses at the second center wavelength may be launched for the second group of FBGs 114 at times $t_3$ and $t_4$, and a third pair of sensing and reference pulses at the third center wavelength may be launched for the third group of FBGs 114 at times $t_5$ and $t_6$, with $t_1<t_2<t_3<t_4<t_5<t_6$. In this manner different wavelengths of light may be used to interrogate different lengths of the fiber 112. In an alternative embodiment, light pulses having different wavelengths may be simultaneously launched into the fiber 112; in this embodiment and applying the terminology of the immediately preceding example, $t_1=t_3=t_5$ and $t_2=t_4=t_6$, with each of $t_1$, $t_3$, and $t_5>t_2$, $t_4$, and $t_6$.

Figure 6:
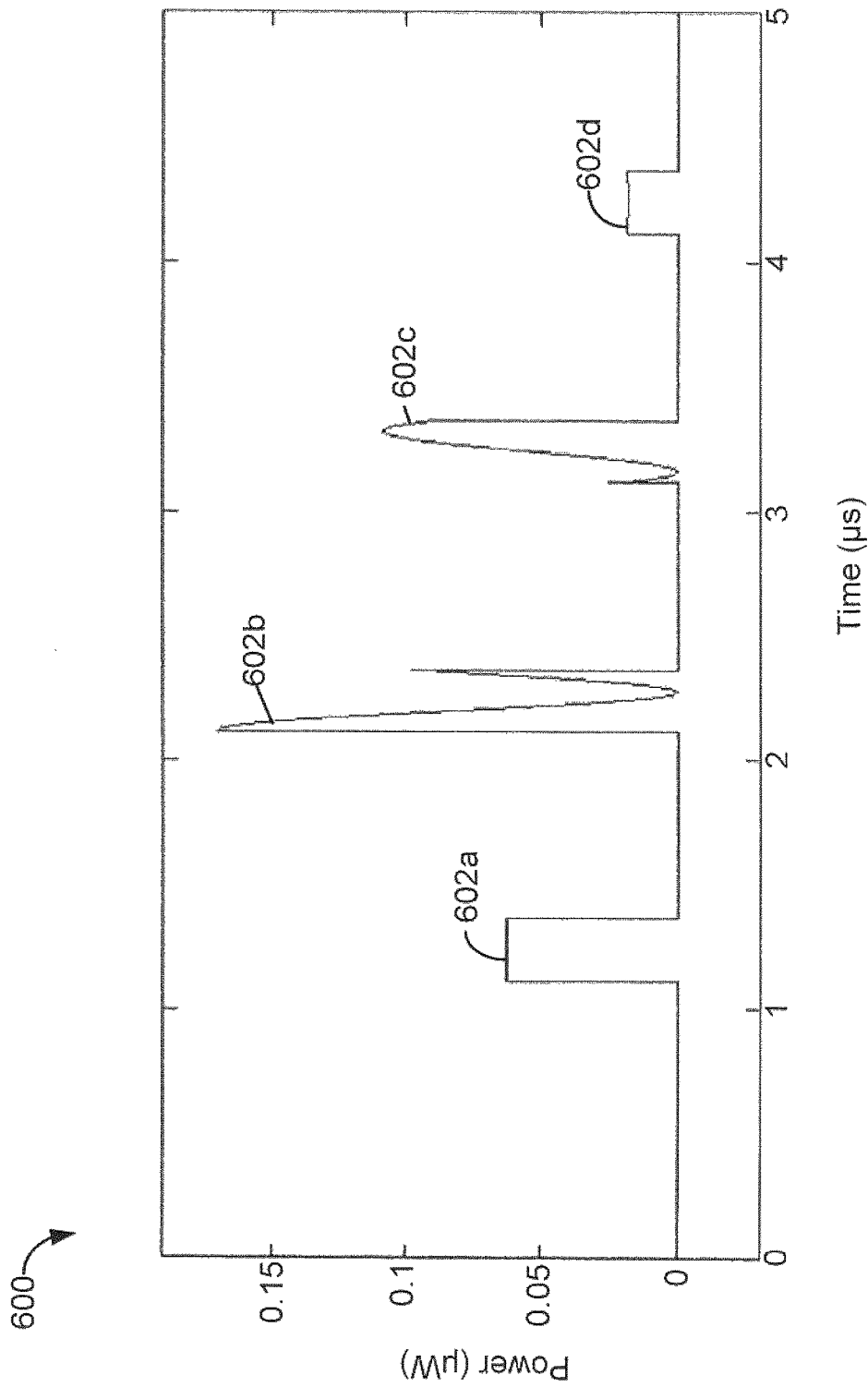
FIG. 6 is a graph of example pulses resulting from reflections of sensing and reference pulses off of the FBGs.

Example interference patterns are depicted in FIG. 6. FIG. 6 shows a graph 600 of first through fourth pulses 602a-d (collectively, "pulses 602") resulting from reflections off of the FBGs 114 of the sensing and reference pulses generated using the interrogator 300 of FIG. 3. The pulses 602 are measured after the receiver circuitry 322 has converted the reflections from an optical to an electrical signal.

The graph 600 is generated by interrogating three of the FBGs 114: the first and second FBGs 114a,b and a third FBG 114 (not depicted in FIG. 3) located along the optical fiber 112 further from the interrogator 300 than the second FBG 114b, with the three FBGs 114 equally spaced from each other. The first pulse 602a shows the sensing pulse after it has reflected off of the first FBG 114a; the second pulse 602b shows the interference resulting from the reference pulse after it has reflected off the first FBG 114a and the sensing pulse after it has reflected off the second FBG 114b; the third pulse 602c shows the interference resulting from the reference pulse after it has reflected off the second FBG 114b and the sensing pulse after it has reflected off the third FBG 114c; and the fourth pulse 602d shows the reference pulse after it has reflected off the third FBG 114.

Any variation in the optical length of the fiber segment 116 between the first and second FBGs 114a,b is reflected in the phase variation of the second pulse 602b. Similarly, any variation in the optical length of the fiber segment 116 between the second FBG 114b and the third FBG 114 is reflected in the amplitude variation of the third pulse 602c. As discussed above in respect of FIGS. 1A-1C, the optical length of the fiber 112 can be changed in response to dynamic strain, of which one type is strain in the fiber 112 caused by an acoustic signal.

Alternative Embodiments

In addition to the example embodiment of the interrogator 300 shown in FIG. 3, alternative embodiments are possible. Example alternative embodiments of the interrogator 300 are shown in FIGS. 4 and 5.

FIG. 4 shows an embodiment of the interrogator 300 in which a polarization controller 404 is optically coupled between the phase modulator 310 and the output optical amplifier 314 and in which a polarization splitter 402 is optically coupled between the optical circulator 320 and the receiver circuitry 322. In FIG. 4, the output optical amplifier 314 and the optical circulator 320 are polarization maintaining components, and all the fiber 112 between the polarization controller 404 and the FBGs 114 (including the fiber segment 116) and between the polarization controller 404 and the polarization splitter 402 is polarization maintaining fiber ("PMF"). An example brand of PMF is Panda Fiber™ manufactured by Fujikura™ Ltd. The polarization controller 404 is actively controlled by, and accordingly communicatively coupled to, the controller 324. Regardless of the polarization of the light entering the polarization controller 404, the polarization controller 404 converts the polarization of any laser light exiting the phase modulator 310 into a known polarization, which the PMF maintains. Both the sensing and reference pulses will consequently enter the output optical amplifier 314 in the same polarization state, and any changes in polarization between the output optical amplifier 314 and the receiver circuitry 322 will be experienced by both pulses except for any polarization changes occurring in the fiber segments 116 between pairs of the FBGs 114. This helps to keep the polarizations of the sensing and reference pulses aligned, which increases the degree to which the pulses interfere and consequently the sensitivity of the interrogator 300. The polarization splitter 402 allows either all reflected light or any one of three polarizations of reflected light, each separated by 120°, to pass through to the receiver circuitry 322 while discarding the remaining polarizations. Permitting only one polarization to reach the receiver circuitry 322 allows the receiver circuitry 322 to discard noisy data that could reduce the interrogator's 300 sensitivity and accuracy. The polarization splitter 402 can also be used to permit any combination of the three polarizations of the reflected light, such as the sum of any two or all three polarizations of the reflected light, to reach the receiver circuitry 322 if desired.

The polarization controller 404 in FIG. 4 increases component selection flexibility by permitting selection of a wider range of lasers than when the polarization controller 404 is not used. Commercially available lasers may or may not output light of a fixed polarization; the polarization controller 404 allows polarization of the laser 302 to be adjusted. Accordingly, the laser 302 need not emit light of a constant and known polarization in order for the interrogator 302 to emit light of a known polarization to the FBGs 114. Similarly, the polarization controller 404 allows non-PMF to be used between the laser 302 and the polarization controller 404 and allows the optical components between the laser 302 and the polarization controller 404 to not be polarization maintaining while still permitting the interrogator 300 to enjoy at least some benefits of polarization control. In an alternative embodiment (not depicted), the polarization controller 404 can be omitted from the interrogator 300 of FIG. 4 and the laser 302 can be configured to output a known and fixed polarization and be used in conjunction with PMF and polarization maintaining optical components. In another alternative embodiment (not depicted), the polarization controller 404 may be located at a different location in the interrogator 300 than that shown in FIG. 4. For example, the laser 302 may be a communication or narrow line width laser purchased in conjunction with the PMF and with the laser polarization aligned to the PMF with the polarization controller 404 located between the laser 302 and the phase modulator 310.

In another alternative embodiment, the interrogator 300 may omit the polarization splitter 402, such as when the optical fiber 112 outside of the interrogator 300 (including the fiber 112 comprising the FBGs 114) is PMF. In additional alternative embodiments (not depicted), the interrogator 300 may instead comprise a polarization separating component other than the polarization splitter 402. For example, the polarization splitter 402 may be replaced with any one or more of polarization filters of 0°, 45°, and 90°, and open receivers.

FIG. 5 shows an embodiment of the interrogator 300 in which the laser 302, first and second optical isolators 304a,b, optical attenuator 306, and first optical amplifier 308 of FIG. 3 are replaced with an electroabsorption modulated laser 502 (hereinafter "EML 502"). The EML 502 comprises an integrated optical isolator and an absorption region that acts as amplitude modulation circuitry. The controller 324 is communicatively coupled to the EML 502 to permit the controller 324 to control amplitude modulation. Using the EML 502 instead of the components in FIG. 3 that it replaces results in component and cost savings and can improve extinction performance relative to using an external SOA for amplitude modulation.

Figure 9A:
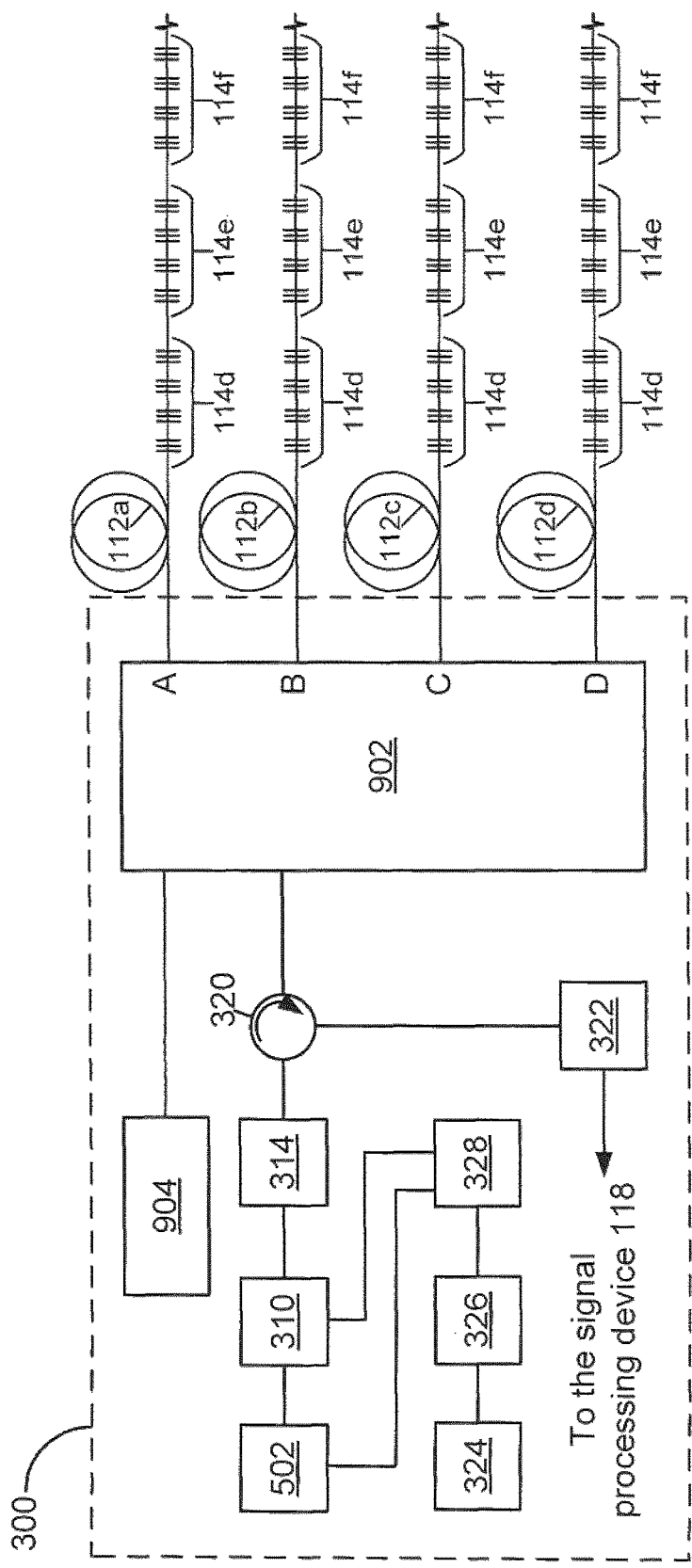

Referring now to FIG. 9A, there is shown an embodiment of the interrogator 300 designed for multi-channel data acquisition in which there are multiple fibers 112, with each of the fibers comprising different groups of the FBGs 112 that are interrogated using TDM as described above. The interrogator 300 of FIG. 9A is based on the interrogator 300 of FIG. 5 with the addition of an optical switch 902 interposed between the optical circulator 320 and the output of the interrogator 300, and the presence of switching control circuitry 904 that is communicatively coupled to and that controls operation of the optical switch 902. The switching control circuitry 904 may be, for example, an application specific integrated circuit, an FPGA, a microprocessor, a microcontroller, or any other suitable type of analog, digital, or mixed signal circuitry. The control circuitry 904 may be distinct from the controller 324 as shown in FIG. 9A or alternatively comprise part of the controller 324 (not shown). The optical switch 902 may be, for example, an EPS0116S switch from EpiPhotonics Corp. of San Jose, Calif. The switching control circuitry 904 is operable to cause the optical switch 902 to select any one of channels A, B, C, and D for outputting the sensing and reference pulses and for receiving reflected pulses. Channels A-D are connected to first through fourth lengths of the fiber 112a-d ("first through fourth channels 112a-d"). On each of the channels 112a-d are first through third groupings of FBGs 114d-f ("first through third FBG groups 114d-f"). The FBGs 114 comprising the first FBG group 114d are all tuned to reflect an identical, first wavelength of light; the FBGs 114 comprising the second FBG group 114e are all tuned to reflect an identical, second wavelength of light that differs from the first wavelength; and the FBGs 114 comprising the third FBG group 114f are all tuned to reflect an identical, third wavelength of light that differs from the first and second wavelengths.

The EML 502 in FIG. 9A is configured to output light pulses at the first, second, and third wavelengths, thus enabling the interrogator 300 of FIG. 9A to be used for wavelength division multiplexing ("WDM"). The receiver circuitry 322 is similarly photosensitive to the different wavelengths of light, and consequently is able to receive and output signals corresponding to the interference patterns generated by the pulses sent at those different wavelengths. In alternative embodiments (not depicted), different light sources may be used; for example, several different lasers 302 may be multiplexed together and externally modulated in a manner analogous or identical to that shown in FIGS. 3 and 4 as opposed to using an absorption region as in the EML 502.

Figure 9B:
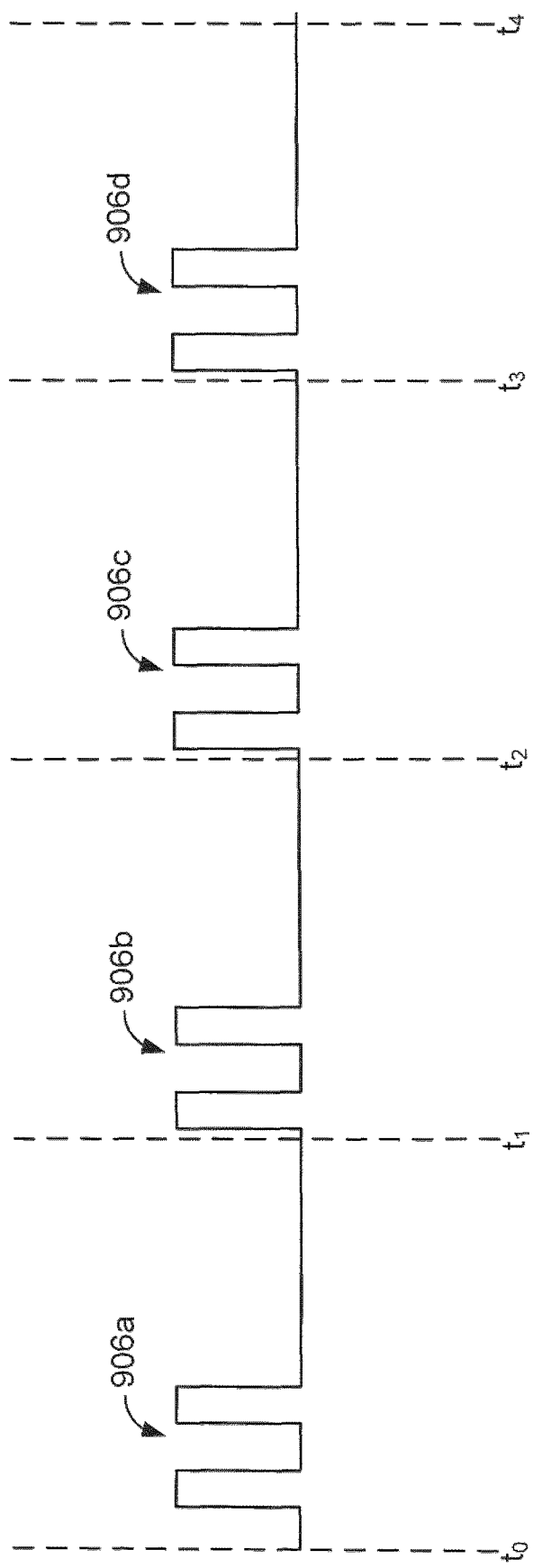
FIG. 9B depicts an example of pulse timing applicable to the optical interrogator of FIG. 9A.

Referring now to FIG. 9B, there is shown an example of pulse timing applicable to the interrogator 300 of FIG. 9A. In FIG. 9B, the switching control circuitry 904 instructs the optical switch 902 to transmit along the first channel 112a, and the interrogator 300 then sends a first pair of pulses 906a along the first channel 112a shortly after time $t_0$. The first pair of pulses 906a is transmitted simultaneously using the first through third wavelengths corresponding to the wavelengths the first through third FBG groups 114d-f are tuned to reflect, respectively. The first pair of pulses 906a (multiplexed using three different wavelengths of light) travels along the first channel 112a, with the first pair of pulses 906a at the first wavelength reflecting off the first FBG group 114d, the first pair of pulses 906a at the second wavelength reflecting off the second FBG group 114e, and the first pair of pulses 906a at the third wavelength reflecting off the third FBG group 114f. The receiver circuitry 322 receives the three interference patterns between the end of the first pair of pulses 906a and time $t_1$, which is shown in FIG. 9B. The receiver circuitry 322 receives the interference pattern at the first wavelength as reflected by the first FBG group 114d, then at the second wavelength as reflected by the second FBG group 114e, and then at the third wavelength as reflected by the third FBG group 114f. The switching control circuitry 904 then instructs the optical switch 902 to transmit along the second channel 112b, and the interrogator 300 then analogously transmits a second pair of pulses 906b along the second channel 112b shortly after time $t_1$ and receives interference patterns at the three wavelengths of light between the end of the second pair of pulses 906b and time $t_2$. Similarly, the switching control circuitry 904 then instructs the optical switch 902 to transmit along the third and fourth channels 112c,d, following which the interrogator 300 then analogously transmits a third and a fourth pair of pulses 906c,d along the third and fourth channels 112c,d shortly after times $t_2$ and $t_3$ and receives interference patterns at the three wavelengths of light between the end of the third pair of pulses 906c and time $t_3$ and the fourth pair of pulses 906d and time $t_4$, respectively.

In FIG. 9A, the different channels 112a-d may correspond, for example, to different assets that the interrogator 300 is being used to monitor. For example, the different channels 112a-d may correspond to different pipelines that the interrogator 300 is monitoring. For any one of the channels 112a-d, the different FBG groups 114d-f may correspond to different portions of the asset being monitored. For example, the different FBG groups 114d-f may represent different lengths of a pipeline. Using multiple wavelengths to monitor different portions of a single asset, such as a pipeline, helps to reduce reflection losses and increase signal-to-noise ratio, since fewer of the FBGs 114 are used to reflect any one wavelength of light.

Although the interrogator 300 of FIG. 9A is based on the interrogator 300 of FIG. 5, in alternative embodiments (not depicted) the optical switch 902 and switching control circuitry 904 may be analogously added to any one or more of the embodiments of the interrogator 300 shown in FIGS. 3 and 4. Alternatively, the switching control circuitry 904 and optical switch 902 may be added to other, non-depicted embodiments of the interrogator 300. Furthermore, although the optical switch 902 in FIG. 9A comprises the four channels 112a-d, in alternative embodiments (not depicted), the optical switch 902 may have only two channels, only three channels, or more than four channels.

In another alternative embodiment (not depicted), the optical switch 902 and switching control circuitry 904 may be missing, and the interrogator 300 may be nonetheless be used to interrogate multiple channels. For example, the different channels 112a-d can be connected in series by connecting the end of one of the channels 112a-d with the beginning of another of the channels 112a-d. The interrogator 300 may then interrogate the different channels using TDM. To reduce reflection losses, alternatively an optical circulator 320 may be placed in between each pair of the channels 112a-d, with each of the optical circulators 320 redirecting reflections from the FBGs 114 directly to the receiver circuitry 322. For example, the optical circulator 320 placed between the first and second channels 112a,b redirects reflections from the FBG groups 114d-f in the second channel 112b to the signal processing device 322.

In another alternative embodiment (not depicted), the interrogator 300 may comprise the switching control circuitry 904 and the optical switch 902 and be configured to transmit along multiple channels, but not use a WDM-capable light course.

In any of the embodiments herein some or all of the optical fiber 112 used to connect the various optical components within the interrogator 300 may be PMF and the optical components themselves may be polarization maintaining. As discussed above in respect of FIG. 4, maintaining polarization between the sensing and reference pulses using PMF can increase the interrogator's 300 sensitivity by using PMF throughout, and optionally outside, of the interrogator 300. In variants of the embodiments of FIGS. 3 and 4, for example, PMF may be used to optically couple only the components between the laser 302 and the interrogator's 300 output, only between the interrogator's 300 output and the receiver circuitry 322, or all optical components within the interrogator 300; and regardless of whether PMF is used to optically couple the interrogator's 300 internal components together, PMF may be used for some or all of the optical fiber 112 outside of the interrogator 300 and that comprises the FBGs 114. Similarly, in the embodiment of FIG. 5, PMF may be used to optically couple only the components between the EML 502 and the interrogator's 300 output, only between the interrogator's 300 output and the receiver circuitry 322, or all optical components within the interrogator 300; and regardless of whether PMF is used to optically couple the interrogator's 300 internal components together, PMF may be used for some or all of the optical fiber 112 outside of the interrogator 300 and that comprises the FBGs 114.

In another alternative embodiment (not depicted), a high power laser can be used as a light source in order to eliminate the output optical amplifier 314. For example, in FIG. 5 a laser rated at at least 100 mW may be used, and the EDFA that acts as the output optical amplifier 314 may be eliminated. This helps to reduce cost and increase SNR. A high power laser can similarly be introduced into the embodiments of FIGS. 3 and 4.

In another alternative embodiment (not depicted), the controller 324 may implement dithering in order to reduce the effect of noise resulting from leakage cross-talk and spontaneous emissions, for example, and thereby increase SNR. As one example, in the embodiments of FIGS. 3 and 4 the first optical amplifier 308, an SOA, is used to generate the reference and sensing pulses by modulating the amplitude of the laser light. However, even when the amplifier 308 is off (i.e. set to completely extinguish the laser light) some of the laser light may still be transmitted through the amplifier 308; this light is referred to as "leakage". The leakage acts as noise and impairs the interrogator's 300 SNR.

The phase modulator 310 may be used to compensate for the leakage by dithering; that is, by phase modulating the leakage at a frequency substantially higher than the interrogator's 300 interrogation frequency. For example, if the interrogator 300 is interrogating the FBGs 114 at a frequency of 4 MHz, the phase modulator 310 may modulate the leakage at a frequency of 20 MHz while the amplifier 308 is off, with the phase modulation varying the phase of the leakage between 0 radians and π radians. When the receiver circuitry 322 receives the reflections from the FBGs 114 the average of the leakage is zero, thus improving the interrogator's 300 SNR relative to examples where dithering is not used. In one embodiment, the phase modulator 310 modulates the leakage at at least twice the interrogation frequency (i.e., the Nyquist frequency) or at some other even multiple of the interrogation frequency, which provides a net DC demodulation of the dither. Modulating the leakage at at least 2.5 times the interrogation frequency provides a potentially useful buffer between the modulation frequency and the Nyquist frequency. Modulating at higher noise dither rates, such as at at least ten times the interrogation frequency, in some embodiments permits analog filtering to be applied to the signal the interrogator 300 receives from the FBGs 114 to reduce costs. For example, in one embodiment, modulating the leakage at a rate of at least one hundred times the interrogation frequency prevents the leakage from being able to pass the bandwidth of the receiver circuitry 322, thus permitting noise filtering without having to add specialized filtering circuitry over and above what is depicted in FIGS. 3-5.

Calibration

Figure 8:
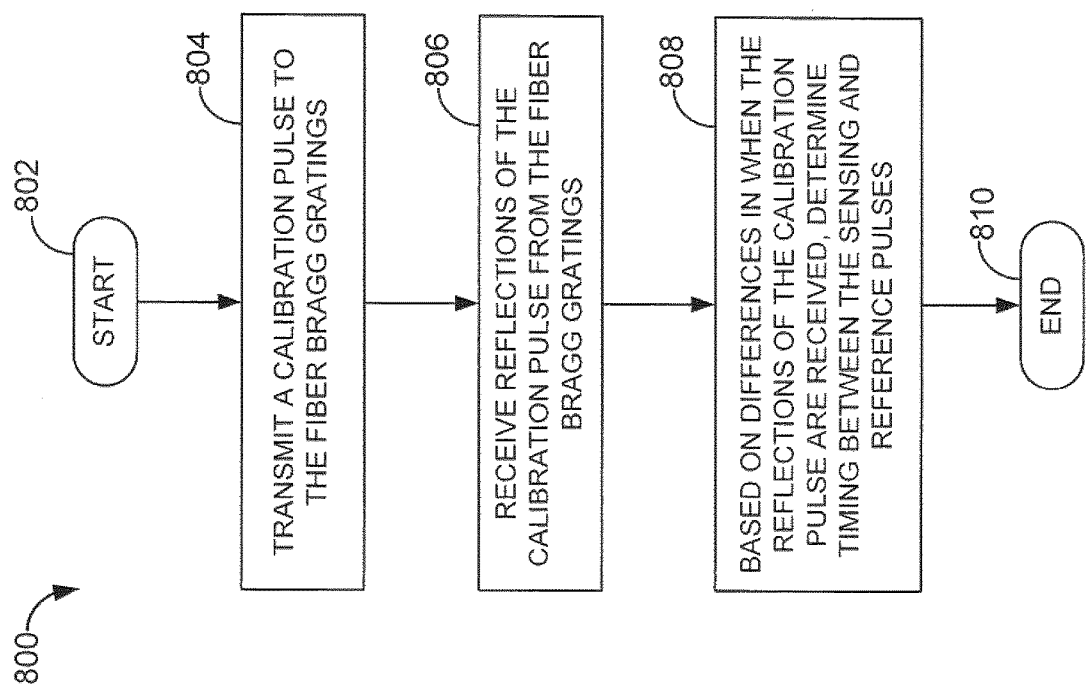
FIG. 8 is a method for calibrating the optical interrogator, according to another embodiment.

Referring now to FIG. 8, there is shown a method 800 for calibrating the interrogator 300, according to another embodiment. The method 800 may be encoded on to the FPGA that comprises the controller 324 as a combination of FPGA elements such as logic blocks. The method 800 is described below in conjunction with the interrogator 300 of FIG. 5, although it may also be performed using other embodiments of the interrogator 300, such as the embodiments of FIGS. 3 and 4.

When performing the method 800, the controller 324 begins at block 802 and proceeds to block 804 where it transmits a calibration pulse to the FBGs 114. This calibration pulse may or may not be phase delayed using the phase modulator 310. The calibration pulse is reflected off each of the FBGs 114 and the reflected pulses return to the interrogator 300 and are received by the receiver circuitry 322 (block 806). The pulse that reflects off the first FBG 114a returns to the receiver circuitry 322 first and has the highest amplitude of the reflected pulses; the pulse that reflects off the second FBG 114b is the second reflected pulse to arrive at the receiver circuitry 322 and has the second highest amplitude, and this pattern continues for the reflections off the remaining FBGs 114. The controller 324 at block 808 determines the timing between the sensing and reference pulses based on differences in when the reflections of the calibration pulse are received at the receiver circuitry 322. In one embodiment, second order reflections from the FBGs 114 (i.e., reflections of reflections) are mitigated using digital signal processing techniques such as infinite impulse response or finite impulse response filters, or through suitable modulation of the sensing and reference pulses such as with Barker codes.

If, for example, the FBGs 114 are equally spaced along the optical fiber 112 then intervals between any two consecutive reflections have identical durations. The controller 324 can store this duration and control pulse generation such that the interval between the sensing and reference pulses is of this duration. As another example, if the FBGs 114 are not equally spaced along the optical fiber 112 then the interval between receipt of the calibration pulse reflections from any two of the FBGs 114 is the interval between the sensing and reference pulses that should be used if interferometry is to occur as a result of reflections off those two FBGs 114. For example, if the interval between the calibration pulse reflections from the first and second FBGs 114a,b is $t_1$ and the interval between the calibration pulse reflections from the second FBG 114b and a third FBG 114 is $t_2$, with $t_1 \neq t_2$, then the controller 324 generates the sensing and reference pulses with a delay of $t_1$ between them if interference is desired between reflections from the first and second FBGs 114a,b and with a delay of $t_2$ between them if interference is desired between reflections from the second FBG 114b and the third FBG 114.

In addition to timing between the reference and sensing pulses, calibration pulses can be used to level power between multiple lasers when wavelength division multiplexing is being used, adjust gain of the various amplifiers 308,314 in the interrogator 300, and determine spacing between the FBGs 114.

Calibration using the calibration pulse can be done at initial setup of the interrogator 300 or periodically while using the interrogator 300 to interrogate the optical fiber 112. The interrogator 300 can be recalibrated as desired; for example, depending on factors such as thermal changes, mechanical changes (e.g. geotechnical shifts), and long term fiber stretching, the interrogator 300 can be recalibrated every few seconds, minutes, hours, or longer. As calibration is done in real-time, any data related to the phase of the reflected pulses that is missed as a result of being received during calibration can be approximated using interpolation. Interpolation can be performed using an intelligent reconstruction filter such as a linear or cubic interpolator.

As discussed above, the interrogator 300 may comprise a single laser that is used as a light source within the interrogator 300, and alternatively (as depicted in FIG. 9A, for example) the interrogator 300 may comprise multiple light sources of different wavelengths multiplexed together to enable WDM.

Furthermore, while the phase modulator 310 in the above embodiments is a lithium niobate phase modulator, in alternative embodiments (not depicted) different types of phase modulators may be used. Example alternative phase modulators are gallium arsenide phase modulators and indium phosphide phase modulators. The phase modulator 310 may or may not be a Mach Zehnder-type modulator.

Aside from an FPGA, the controller 324 used in the foregoing embodiments may be, for example, a processor, a microprocessor, microcontroller, programmable logic controller, or an application-specific integrated circuit. For example, in one alternative embodiment, the controller 324 collectively comprises a processor communicatively coupled to a non-transitory computer readable medium that has encoded on it program code to cause the processor to perform one or both of the example methods of FIGS. 7 and 8. Examples of computer readable media are non-transitory and include disc-based media such as CD-ROMs and DVDs, magnetic media such as hard drives and other forms of magnetic disk storage, semiconductor based media such as flash media, random access memory, and read only memory.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. An optical fiber interrogator for interrogating optical fiber comprising fiber Bragg gratings ("FBGs"), the interrogator comprising:
   (a) a light source operable to emit phase coherent light;
   (b) amplitude modulation circuitry optically coupled to the light source and operable to generate pulses from the light, wherein the pulses are generated without splitting the light; and
   (c) control circuitry comprising a controller, communicatively coupled to the amplitude modulation circuitry, configured to perform a method for interrogating the optical fiber comprising generating a pair of light pulses by using the amplitude modulation circuitry to modulate light output by the light source,
   wherein the amplitude modulation circuitry comprises:
      (i) an input optical isolator and an output optical isolator isolating an input and output of the amplitude modulation circuitry, respectively;
      (ii) an optical attenuator optically coupled between the input and output isolators; and
      (iii) a first optical amplifier optically coupled between the attenuator and the output isolator.

2. The interrogator of claim 1 further comprising a phase modulator optically coupled to the amplitude modulation circuitry and operable to introduce a phase shift to at least one of the pulses, and wherein the method further comprises phase shifting at least one of the light pulses relative to the other of the light pulses by using the phase modulator.

3. The interrogator of claim 2 wherein the phase modulator is selected from the group consisting of a lithium niobate phase modulator, a gallium arsenide phase modulator, and an indium phosphide phase modulator.

4. The interrogator of claim 2 further comprising:
   (a) an output optical amplifier optically coupled to the phase modulator;
   (b) receiver circuitry; and
   (c) an optical circulator comprising first, second, and third ports, wherein the first port is optically coupled to the output optical amplifier, a second port is optically coupled to an output of the interrogator for respectively sending and receiving the pulses to and from the optical fiber, and a third port is optically coupled to the receiver circuitry for processing signals received from the optical fiber.

5. The interrogator of claim 4 further comprising polarization maintaining fiber between the light source and the output of the interrogator such that the polarization of the light is maintained from the light source to the output of the interrogator.

6. The interrogator of claim 5 further comprising a polarization controller optically coupled between the phase modulator and the output optical amplifier.

7. The interrogator of claim 6 further comprising a polarization splitter optically coupled between the third port of the optical circulator and the receiver circuitry.

8. The interrogator of claim 4 further comprising polarization maintaining fiber between the output of the interrogator and the receiver circuitry such that the polarization of reflections off the FBGs are maintained from the output of the interrogator to the receiver circuitry.

9. The interrogator of claim 4 wherein the method further comprises:
   (a) generating a calibration pulse;
   (b) determining when reflections of the calibration pulse off the FBGs arrive at the receiver circuitry; and
   (c) based on differences in when the reflections of the calibration pulse arrive at the receiver circuitry, determining timing between the sensing and reference pulses.

10. The interrogator of claim 2 further comprising:
    (a) receiver circuitry; and
    (b) an optical circulator comprising first, second, and third ports, wherein the first port is optically coupled to the phase modulator, a second port is optically coupled to an output of the interrogator for respectively sending and receiving the pulses to and from optical fiber, and a third port is optically coupled to the receiver circuitry for processing signals received from the optical fiber.

11. The interrogator of claim 10 wherein the light source comprises a laser having a power of at least 100 mW.

12. The interrogator of claim 2 wherein the phase shifting comprises applying a positive phase shift to a first pulse and applying a negative phase shift to a subsequent, second pulse intended to interfere with the first pulse.

13. The interrogator of claim 12 wherein the first and second pulses differ in phase from each other by more than $\pi$ radians.

14. The interrogator of claim 2 wherein the phase shifting comprises applying a non-linear phase shift or a piecewise linear phase shift to at least one of the pulses.

15. The interrogator of claim 14 wherein the phase shift is a Barker code.

16. The interrogator of claim 2 wherein the method further comprises dithering leakage from the amplitude modulation circuitry by phase shifting the leakage between 0 and π radians at a frequency at least 2.5 times higher than a frequency at which interrogation is being performed.

17. The interrogator of claim 1 wherein the light source comprises an electroabsorption modulated laser and the amplitude modulation circuitry comprises an absorption region of the electroabsorption modulated laser.

18. The optical fiber interrogator of claim 1, further comprising an optical switch optically coupled to the light source and comprising at least two output channels, the optical switch operable to switch transmission of light between each of the at least two output channels, wherein the control circuitry is communicatively coupled to the optical switch, and wherein the method further comprises:
  (a) generating an additional pair of light pulses by using the amplitude modulation circuitry to modulate light output by the light source; and
  (b) interrogating each of the at least two optical fibers by using the optical switch to switch transmission amongst the at least two output channels, wherein one of the pairs of light pulses is transmitted to one of the at least two output channels and the other of the pairs of light pulses is transmitted to another of the at least two output channels.

19. A system for interrogating an optical fiber comprising fiber Bragg gratings ("FBGs"), the system comprising:
  (a) an optical fiber interrogator for interrogating the optical fiber, the interrogator comprising:
    (i) a light source operable to emit phase coherent light;
    (ii) amplitude modulation circuitry optically coupled to the light source and operable to generate pulses from the light, wherein the pulses are generated without splitting the light; and
    (iii) control circuitry comprising a controller, communicatively coupled to the amplitude modulation circuitry, configured to perform a method for interrogating the optical fiber comprising generating a pair of light pulses by using the amplitude modulation circuitry to modulate light output by the light source; and
  (b) the optical fiber optically coupled to the interrogator, wherein the optical fiber comprises polarization maintaining fiber,
    wherein the amplitude modulation circuitry comprises:
      (i) an input optical isolator and an output optical isolator isolating an input and output of the amplitude modulation circuitry, respectively;
      (ii) an optical attenuator optically coupled between the input and output isolators; and
      (iii) an optical amplifier optically coupled between the attenuator and the output isolator.

20. A method for interrogating optical fiber comprising fiber Bragg gratings ("FBGs"), the method comprising:
  (a) generating a pair of light pulses from phase coherent light emitted from a light source, wherein the light pulses are generated by modulating the intensity of the light using amplitude modulation circuitry without splitting the light;
  (b) transmitting the light pulses along the optical fiber;
  (c) receiving reflections of the pulses off the FBGs; and
  (d) determining whether an optical path length between the FBGs has changed from an interference pattern resulting from the reflections of the pulses,
    wherein the amplitude modulation circuitry comprises:
      (i) an input optical isolator and an output optical isolator isolating an input and output of the amplitude modulation circuitry, respectively;
      (ii) an optical attenuator optically coupled between the input and output isolators; and
      (iii) an optical amplifier optically coupled between the attenuator and the output isolator.

* * * * *